United States Patent [19]

Delâge et al.

[11] Patent Number: 5,201,021
[45] Date of Patent: Apr. 6, 1993

[54] BRANCHING ARRANGEMENT FOR OPTICAL FIBER CABLES

[75] Inventors: Peter Delâge, Jüchen; Ralph Böhme; Reinhard Girbig, both of Mönchengladbach; Herbert Moers, Korschenbroich, all of Fed. Rep. of Germany

[73] Assignee: AEG Kabel Aktiengesellschaft, Fed. Rep. of Germany

[21] Appl. No.: 885,265

[22] Filed: May 18, 1992

[30] Foreign Application Priority Data

May 24, 1991 [DE] Fed. Rep. of Germany ....... 4116972

[51] Int. Cl.⁵ .............................................. G02B 6/44
[52] U.S. Cl. ................................... 385/114; 174/117 F
[58] Field of Search ................... 385/114, 62, 81, 110, 385/112, 113; 174/115, 117 R, 117 F

[56] References Cited

U.S. PATENT DOCUMENTS 4,980,007 12/1990 Ferguson ................... 385/114 X
5,076,881 12/1991 Ferguson ................... 385/114 X Primary Examiner—John D. Lee
Assistant Examiner—Phan Thi Heartney
Attorney, Agent, or Firm—Ware, Fressola, Van Der Sluys & Adolphson

[57] ABSTRACT

In a branching arrangement for a flat cable, where the flat cable is separated along the area of the subscriber connection from cross-links, which connect an optical vein to the neighboring elements, it is provided that the vein is separated for a long distance from the cable, so that it has no splice connection in the branching area. It is further provided that, the separated optical vein curves over the optical cable at about a right angle, that the separated optical vein is safeguarded by a kink protection tube, and that the cable and the kink protection tube are secured to prevent relative movement therebetween.

15 Claims, 1 Drawing Sheet

BRANCHING ARRANGEMENT FOR OPTICAL FIBER CABLES

The invention concerns a branching arrangement for a flat cable which is separated in the area of the subscriber connection along cross lines.

To connect subscribers to a broad band communications network, the flat optical fiber cable is usually separated from its connection and a connecting sleeve is installed. Only a short length of optical vein can be removed from the cable separation area. Another vein is necessary to establish a connection for the subscriber. A splice may be omitted with an optical cable, from which a longer length of optical vein can be removed. The use of a T-shaped transition sleeve in the heretofore usual manner is associated with higher cost. The optical vein may not contain any kink or have a bending radius of less than 50 mm. If the optical vein is kinked or bent beyond this minimum bending radius, the light would no longer be transmitted but would leave the optical fiber laterally through the optical sleeve. For that reason, until now, the usual branching arrangements required a relatively large space for the splicing cartridge.

An object of the present invention is to produce a splice-free branching arrangement for a flat optical cable, which allows the attachment of a branching optical vein and maintains a minimum bending radius.

DETAILED DESCRIPTION OF THE INVENTION

Figure 1:
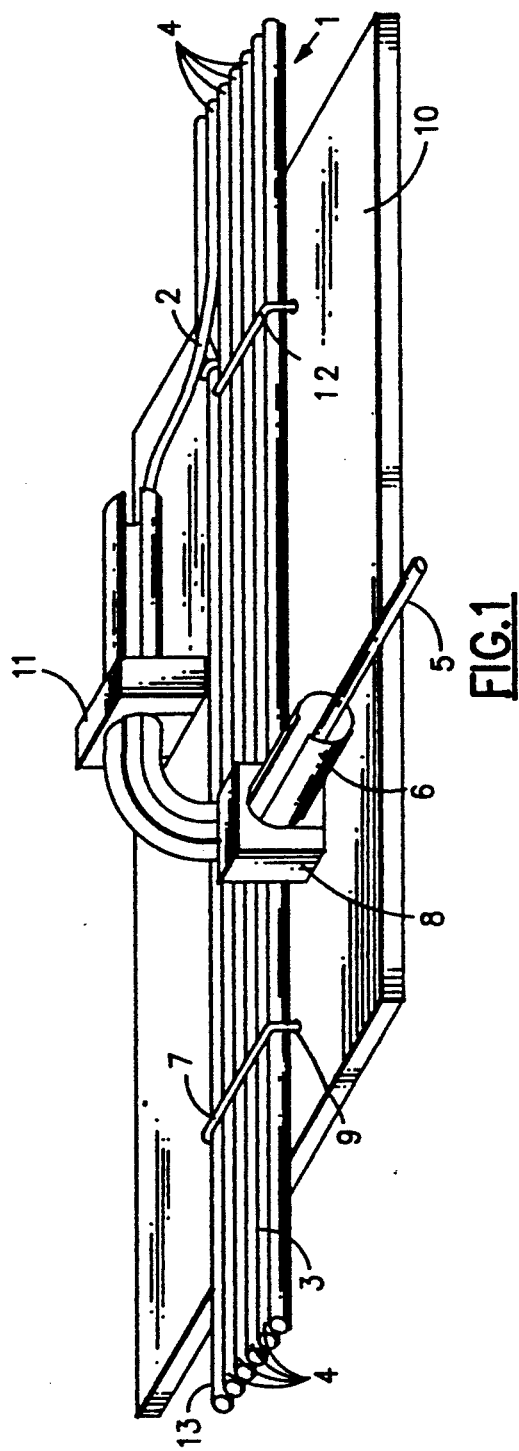
FIG. 1 shows a perspective view of a branching arrangement according to the invention.

In FIG. 1, a flat optical cable 1 comprises five optical veins 2, 4, which are cross-linked to each other and to the outside strain relief elements 3 and 13. One optical vein 2 is separated from the flat cable 1 and becomes the lead to the subscriber. This can take place through a cable channel or a protective tube. The vein 2 passes through a bent protection tube 6 and to an area 5 to the subscriber without any need for splicing. The bent tube 6 serves as kink protector and has a radius of about 100 mm. Tube 6 preferably is made from a synthetic resin material and is longitudinally slit to facilitate placing the optical vein 2 therein. Straps 8 and 11 attach the tube 6 to a base plate 10. The branching optical vein 2 is separated by the bent protection tube 6 for a distance of at least five meters (5 m.) from the cable 1 so that it does not require any splice connection in the bent protection tube 6.

The flat cable 1 and the bent protection tube 6 cannot move relative to each other, since the flat cable 1 is also attached to the base plate 10 by cable ties 7 and 12. This ensures that the optical vein 2 can be subjected to tensile forces without kinking the vein 2. Strain relief elements 3 and 13 not only protect the cable against tensile loads and kinks, but also protect the branching arrangement shown in the figure. Cable ties 7 and 12 pass through openings 9 in the base plate 10 to provide a reciprocal connection.

Thus, it can be seen from the foregoing specification and attached drawing that the present invention provides an effective means to establish connection of subscribers to a broad band communications network.

The preferred embodiment admirably achieves the objects of the present invention; however, it should be appreciated that departures can be made by those skilled in the art without departing from the spirit and scope of the invention which is limited only by the following claims.

What is claimed is:

1. A branching arrangement for a flat cable, comprising:
   a flat cable separated in an area of a subscriber connection along cross links which connect an optical vein with the neighboring elements, at least a portion of the optical vein being separated from the flat cable to branch off from the flat cable, so that the optical vein does not require any splice connection within the branching arrangement;
   kink protection means for safeguarding the optical vein and curving the optical vein to pass above the flat cable so as to extend at about a right angle thereto, the flat cable and said kink protection means being secured so as to prevent relative movement therebetween.

2. A branching arrangement according to claim 1, wherein that said kink protection means includes a bent, thermoplastic tube having a longitudinal slit.

3. A branching arrangement according to claim 2, wherein the flat cable and said kink protection means are attached to a base plate.

4. A branching arrangement according to claim 3, wherein cable ties are provided to attach the flat cable to the base plate through openings in the base plate.

5. A branching arrangement according to claim 3, wherein the tube is attached to the base plate with straps.

6. A branching arrangement according to claim 5, wherein at least five optical veins are located between two-strain relief elements in the flat cable.

7. A branching arrangement according to claim 6, wherein the tube has a curve with a radius of about 100 mm.

8. A branching arrangement according to claim 6, wherein the tube has a curve with a radius of about 140 mm.

9. A branching arrangement according to claim 2, wherein the tube has a curve with a radius of about 100 mm.

10. A branching arrangement according to claim 2, wherein the tube has a curve with a radius of about 140 mm.

11. A branching arrangement according to claim 1, wherein the optical vein is separated from the flat cable for a distance of at least five meters.

12. A branching arrangement according to claim 1, wherein the cable and said kink protection means are attached to a base plate.

13. A branching arrangement according to claim 1, wherein said kink protection means is attached to a base plate with straps.

14. A branching arrangement according to claim 1, wherein cable ties are provided to attach the flat cable to a base plate through openings in the base plate.

15. A branching arrangement according to claim 1, wherein at least five optical veins are located between two strain relief elements in the flat cable.

* * * * *